US006196440B1

(12) United States Patent
Kennedy

(10) Patent No.: US 6,196,440 B1
(45) Date of Patent: Mar. 6, 2001

(54) METHOD AND TOOL FOR IMPRINTING A PATTERN IN A SOLDER

(76) Inventor: Georgia Lee Kennedy, 31 W. Boulder St., Colorado Springs, CO (US) 80904

( * ) Notice: Subject to any disclaimer, the term of this patent is extended or adjusted under 35 U.S.C. 154(b) by 0 days.

(21) Appl. No.: 09/575,854

(22) Filed: May 19, 2000

Related U.S. Application Data

(62) Division of application No. 08/964,355, filed on Nov. 4, 1997, now Pat. No. 6,135,342.
(60) Provisional application No. 60/041,737, filed on Mar. 28, 1997.

(51) Int. Cl.[7] ............................ B23K 1/00; B23K 31/02; B31F 1/07; B44C 5/08

(52) U.S. Cl. ............................ 228/20.5; 228/25; 228/30; 228/121; 228/125; 228/158; 101/5; 428/38; 156/63

(58) Field of Search .................................... 228/121, 125, 228/158, 20.5, 25, 30, 26; 101/5, 6, 8, 9, 22, 25, 27; 72/191, 192, 210, 211; 428/38; 156/63; 29/17.1, 17.2, 527.1, 896.41, 896.43, 896.4

(56) References Cited

U.S. PATENT DOCUMENTS

| | | | | |
|---|---|---|---|---|
| 3,676,920 | * | 7/1972 | Pilditch | 29/472.5 |
| 3,750,265 | * | 8/1973 | Cushman | 29/471.3 |
| 4,016,810 | * | 4/1977 | Szikla | 101/4 |
| 4,255,475 | * | 3/1981 | DelGrande | 428/44 |
| 4,312,688 | * | 1/1982 | Brodis et al. | 156/63 |
| 4,600,466 | * | 7/1986 | Herrmann | 156/391 |
| 4,619,850 | * | 10/1986 | Charlton | 428/38 |
| 4,690,852 | * | 9/1987 | Hull | 428/156 |
| 4,880,485 | * | 11/1989 | Lewis et al. | 156/108 |
| 5,111,572 | * | 5/1992 | Haiml et al. | 29/469.5 |
| 5,116,174 | * | 5/1992 | Fried et al. | 409/79 |
| 5,350,105 | * | 9/1994 | Delalle et al. | 228/56.3 |
| 5,611,144 | * | 3/1997 | Gusky | 29/896.411 |
| 5,789,066 | * | 8/1998 | De Mare et al. | 428/156 |

* cited by examiner

*Primary Examiner*—Patrick Ryan
*Assistant Examiner*—Kiley Stoner
(74) *Attorney, Agent, or Firm*—Dale B. Halling

(57) ABSTRACT

A tool (40) for imprinting a pattern in a has a handle (42). A stamp (44), connected to the handle (42), has a pattern (54) formed on a face (52) of the stamp (44). The face (52) of the stamp (44) forms a concave surface.

14 Claims, 2 Drawing Sheets

METHOD AND TOOL FOR IMPRINTING A PATTERN IN A SOLDER

This application claim benefit to Provisional application Ser. No. 60/041,737, filed Mar. 28, 1997. This is a division of copending U.S. patent application Ser. No. 08/964,355 now U.S. Pat. No. 6,135,342, filed on Nov. 4, 1997, which application is hereby incorporated by reference herein.

FIELD OF THE INVENTION

The present invention relates generally to the field of tools and more particularly to a tool for imprinting a pattern in a solder.

BACKGROUND OF THE INVENTION

Panes of stained glass are commonly held together by solder to form a stained glass window. Two panes of stained glass 10, 12 (See FIG. 1) are connected together along a joint line 14. An edge 16 of the first pane 10 and an edge 18 of the second pane 12 are covered with a copper foil 20, 22. The edges 16, 18 are then abutted and a line of solder 24 is applied to hold the panes 10, 12 together alone the joint line 14. By carefully cutting pieces of stained glass so that they abut each other along one edge and then joining the pieces as described above, an artistic stained glass window is formed. Commonly a wood frame is then placed around the outside edges of the panes to finish the window. Since stained glass windows are mainly designed for their aesthetic appearance, artists have tried to pattern the solder on the joint lines. Some artists have formed patterns in the solder by placing little beads of solder on top of the solder forming the joint line. However, this results in a very limited set of patterns that can be formed in the joint lines.

Thus there exists a need for a method and a tool for forming a pattern in a solder.

SUMMARY OF THE INVENTION

A tool for imprinting a pattern in a solder that overcomes these and other problems has a handle. A stamp, connected to the handle, has a pattern formed on a face of the stamp. The face of the stamp forms a concave surface.

DETAILED DESCRIPTION OF THE DRAWINGS

Figure 1:
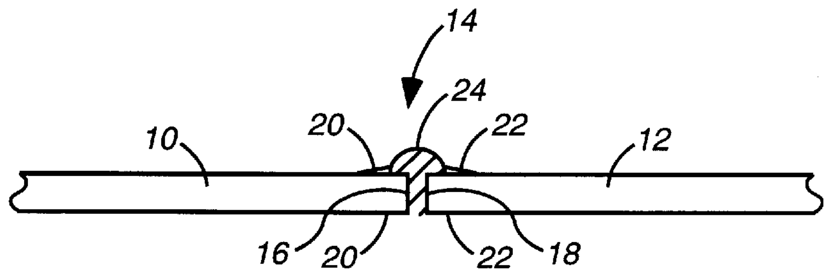
FIG. 1 is a an edge view of a joint line of a stained glass window.
Figure 2:
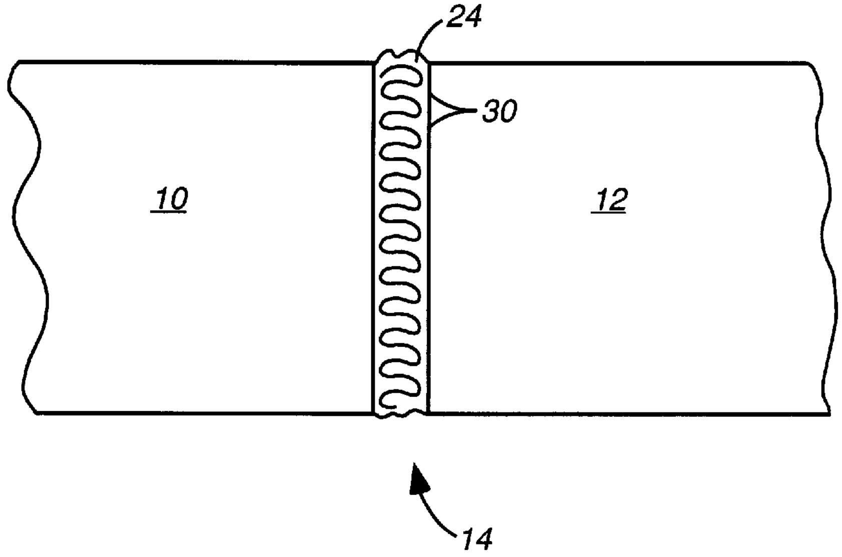
FIG. 2 is a top view of a joint line of a stained glass window, having a pattern imprinted in a solder.

FIG. 2 is a top view of a joint line 14 of a stained glass window, having a pattern 30 imprinted in a solder 22. The pattern 30 is shown as a wavy line on the solder 22. However, an almost infinite variety of patterns can be formed in the solder 30.

Figure 3:
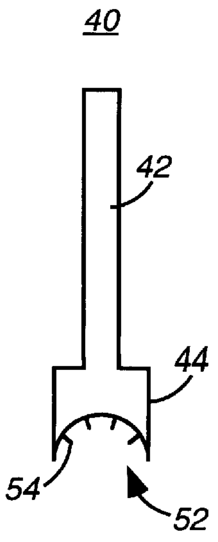
FIG. 3 is a side view of a tool for imprinting a pattern in a solder.
Figure 4:
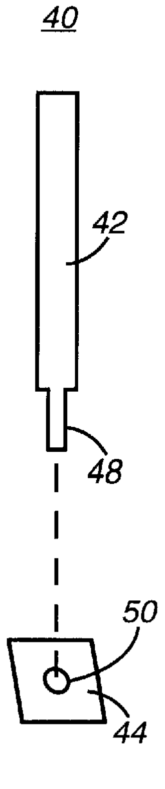
FIG. 4 is an exploded side view of the tool for imprinting a pattern in a solder.

FIGS. 3 & 4 are side views of a tool 40 for imprinting a pattern in a solder. The tool 40 has a handle 42 that is connected to a stamp 44. In one embodiment the stamp (detachable stamp) 44 is detachable from the handle 42. The handle 42 has a male threaded portion 48 that engages a female threaded opening 50 in the stamp. Other methods of attachment will be obvious to those skilled in the art and contemplated by the invention.

The stamp 44 has a face 52 having a pattern 54. In one embodiment the face 52 forms a concave surface. The face 52 is designed to have shape that is approximately the mirror image of the solder line. Because solder lines can have different widths, different stamps 44 have faces of differing widths.

A user after applying the solder along the joint line uses a soldering iron to re-heat the solder. When the solder is malleable the user presses the stamp onto the malleable solder. The solder is then imprinted with the pattern on the face of the stamp. This process is then repeated for the next section of the solder. In the preferred embodiment, the solder melts at a low temperature (low melting point) and is made of either lead, tin or some combination thereof. In one embodiment the stamp is first placed in a lubricant before the user presses the stamp onto the malleable solder. This keeps the stamp from adhering to the solder. The lubricant can be: oil; wax; paraffin or powdered carbon.

The tool 40 can be made from a variety of materials. In one embodiment, the handle 42 is made from wood. Wood prevents heat from the soldering iron or the solder from being transmitted to the users' hands. In another embodiment the tool 40 is made of iron. The stamp 44 can be chrome plated. The chrome plating reduces the tendency of the solder to stick (adhere) to the stamp. In another embodiment the tool is made of stainless steel. In another embodiment the tool 40 is made of a high temperature plastic, such as PEEK polyetheretherkeytone, polyimide, polyester liquid crystal polymer (LPC), and PPS polyphenylene sulfide. In yet another embodiment the stamp is made of plastic and a metal plated onto the face of the stamp. This provides an extra layer of thermal protection and keeps the shape of the plastic rigid if it becomes malleable. Generally, the metal is electroplated to the face of the stamp. In yet another embodiment the stamp is made of composite.

Figure 5:
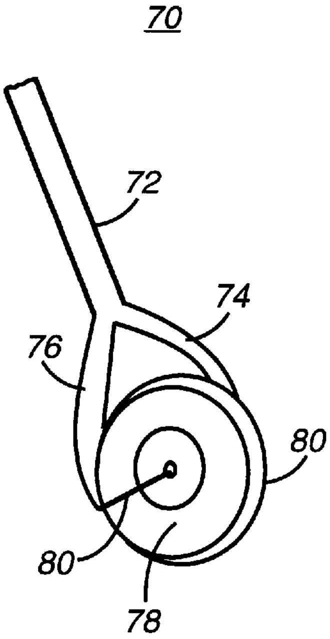
FIG. 5 is a perspective view of another embodiment of a tool for imprinting a pattern in a solder.

FIG. 5 is a perspective view of another embodiment of a tool 70 for imprinting a pattern in a solder. The tool 70 has a handle 72 that forks into a pair of tines 74, 76 at one end. An axle 80 attaches to the pair of tines 74, 76. A circular stamp 78 is connected to the axle 80. The rim 80 of the stamp 78 is concave and has a pattern formed thereon. As the user heats up the solder, the tool can be rolled onto the malleable solder. This reduces the effort required by the user and does not require the user to align the pattern with the previously stamped portion of the solder. The tool 70 can be made of the same materials as described above with respect to the tool 40 of FIGS. 3 & 4. The tool 70 can also be used with a lubricant.

Figure 6:
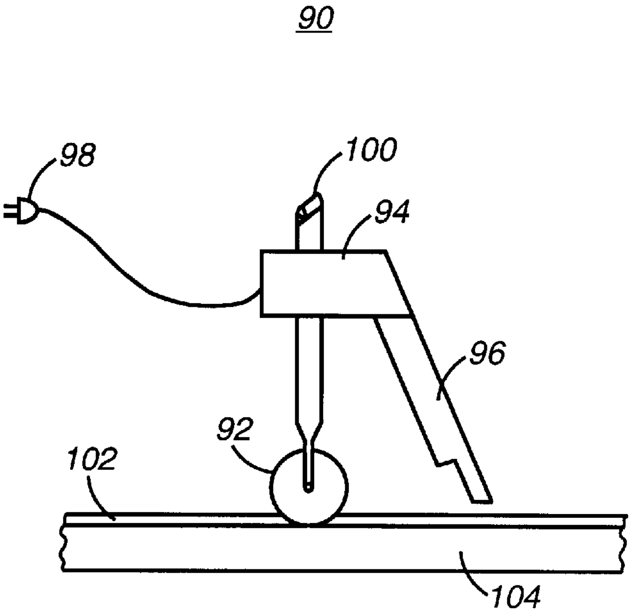
FIG. 6 is a side view of another embodiment of a tool for imprinting a pattern in a solder.

FIG. 6 is a side view of another embodiment of a tool 90 for imprinting a pattern in a solder. In this case the tool 90 includes a circular stamp 92, similar to the stamp of FIG. 5. The stamp 92 is connected to a body 94. A heating element 96 is also connected to the body 94. A power source is provided for the heating element 96, such as a power cord 98 or batteries. A handle 100 is attached to the body 94. Generally, the heating element 96 is close to the stamp 92 so that the solder 102 does not harden before the stamp 92 can imprint the solder. The solder 102 is shown on a glass pane (joint line) 104. The tool 90 allows the user to combine the operations of heating the solder 102 and stamping the solder in one convenient package.

Figure 7:
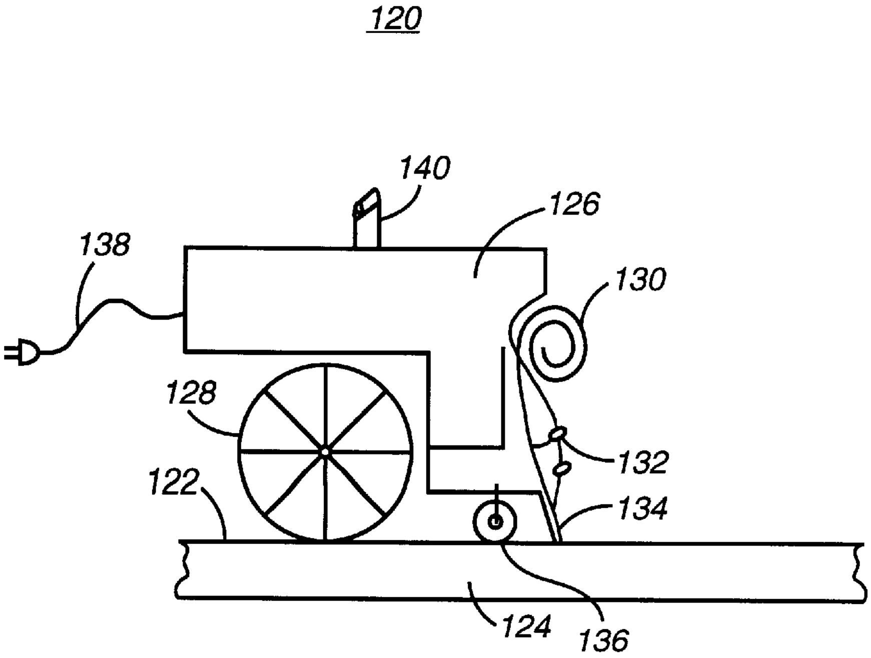
FIG. 7 is a side view of another embodiment of a tool for imprinting a pattern in a solder.

FIG. 7 is a side view of another embodiment of a tool 120 for imprinting a pattern in a solder 122. The tool 120 is shown on a cross section of a joint line and shows a pane of stained glass 124. In this embodiment, the tool 120 has a body 126 connected to a pair of wheels 128. The wheels 128, in one embodiment, drive a gear mechanism that turns a spool of solder 130. The solder 130 is forced through some guides 132 onto a heating element 134. The heating element 134 liquefies the solder 130 and the solder is deposited on the joint line. A stamp 136 is connected to the body 126. The heating element 134 receives power from a power source, such as a power cord 138. A handle 140 connected to the body 126 allows the user to control the tool 120. The tool 120 allows the user to deposit the solder on the joint line and form the decorative pattern on the solder line 122 all in the same process. In another embodiment the guides form an orifice through which the solder is forced. The orifice has a pattern and the solder solidifies in the form of the orifice.

Thus there has been described a method and a tool for imprinting a pattern in a solder, that allows the user to form a wide variety of patterns in the solder. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A tool for placing a decorative pattern in a solder used to join a pair of panes of stained glass comprising:

a handle; and a stamp connected to the handle having a pattern formed on a face of the stamp, the face forming a concave surface.

2. The tool of claim 1, wherein the stamp is detachable from the handle.

3. The tool of claim 1, wherein the stamp is made from a material selected from the group consisting of: plastics or composites.

4. The tool of claim 1, wherein the stamp is made of iron.

5. The tool of claim 4, wherein the stamp further includes a chrome plating over the iron.

6. The tool of claim 1, further including a heating element attached to the handle and providing heat to the stamp.

7. The tool of claim 1, wherein the stamp is circular and the pattern is formed on a rim.

8. The tool of claim 7, wherein the stamp is coupled to an axle and the axle is coupled to the handle.

9. The tool of claim 1, wherein the stamp forms an orifice through which the solder in a malleable state is forced.

10. The tool of claim 1, wherein the face is plated with a metal.

11. The tool of claim 1, wherein the face is electro-plated with a metal.

12. A tool for placing a decorative pattern in a solder used to join a pair of panes of stained glass comprising:

a handle; and a detachable stamp connected to the handle, the detachable stamp having a pattern formed in a face of the detachable stamp, the face of the detachable stamp being capable of operating at temperatures above 300 degrees Fahrenheit.

13. The tool of claim 12 wherein the detachable stamp is formed of a plastic.

14. The tool of claim 12, wherein the face of the stamp is plated with a metal.

* * * * *